United States Patent Office

3,144,437
Patented Aug. 11, 1964

3,144,437
CHROMIUM AND COBALT COMPLEX COMPOUNDS OF MONOAZO DYESTUFFS
Hanspeter Uehlinger, Binningen, Switzerland, assignor to Sandoz A.G., Basel, Switzerland
No Drawing. Filed July 10, 1958, Ser. No. 747,570
Claims priority, application Switzerland Mar. 15, 1957
6 Claims. (Cl. 260—147)

This application is a continuation-in-part of the U.S. application, Serial No. 720,015, filed March 10, 1958, now abandoned.

This invention relates to the chromium and cobalt complex compounds of monoazo dyestuffs of the general formula

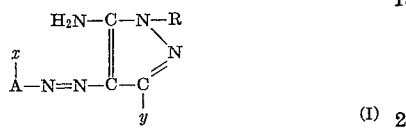

(I)

wherein $x$ stands for a substituent in ortho-position to the azo group capable of taking part in metal complex formation,
$y$ a hydrogen atom or a methyl group,
A the radical of a diazo component of the benzene series which may carry non-ionic substituents, and
R a mononuclear or dinuclear aromatic radical which may carry non-ionic substituents.

Especially valuable dyestuffs are the chromium and cobalt complex compounds of the monoazo dyestuffs of the general formula

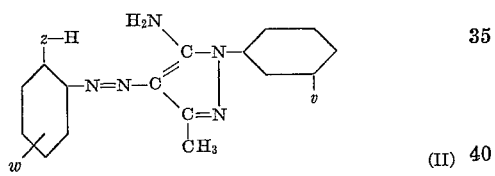

(II)

wherein $z$—H represents a hydroxy or carboxy group,
$w$ represents a hydrogen atom or a sulfonic acid-amide group, which may be further substituted, and
$v$ represents a hydrogen or a chlorine atom.

The process for the production of the new metal complex compounds of monoazo dyestuffs consists in coupling 1 mol of the diazo compound of an aminobenzene which contains in ortho-position to the amino group a substituent capable of taking part in metal complex formation but is free from carboxylic acid groups in meta- or para-position to the amino group and from sulfonic acid groups with 1 mol of a 5-aminopyrazole of the general formula

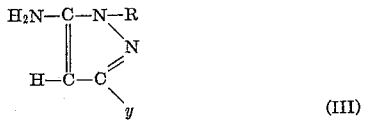

(III)

wherein R and $y$ possess the aforenamed meanings, and treating the resultant monoazo compound in substance with a metal-yielding agent in such a manner that a metal-containing azo dyestuff is obtained which contains essentially 1 atom of metal in complex combination with 2 molecules of the monoazo compound.

The substituent $x$ of the diazo component capable of taking part in metal complex formation is preferably a hydroxy, methoxy or carboxy group. Examples of substituents which may be contained in A and R, as here defined, are halogen atoms (chlorine, bromine), nitro, acetylamino, carbomethoxyamino, carbethoxyamino, methyl, ethyl, tert.butyl, methoxy, sulfonic acid-amide, sulfonic acid-methylamide, sulfonic acid-dimethylamide, sulfonic acid - (2' - hydroxy) - ethylamide, sulfonic acid-di(2'-hydroxyethyl)amide, sulfonic acid-hydroxypropylamide, sulfonic acid-methoxypropylamide, sulfonic acid-phenylamide, methylsulfonyl and ethylsulfonyl groups.

The aminobenzenes are diazotized in the normal manner at 0° to 5° C. The resultant diazo compounds are coupled with the coupling components of Formula III at 10° to 40° C. in a weakly acid medium, if desired in presence of a tertiary base like pyridine. The monoazo dyes thus formed are, if necessary, precipitated from the coupling mass by means of common salt or acid and then filtered off, washed and dried.

Chromium or cobalt compounds are preferred for converting the monoazo dyestuffs into their metal complex compounds. Metallization is best carried out in an aqueous solution or an organic medium, for example formamide, dimethylformamide, ethylglycol, or in the concentrated aqueous solution of an alkali metal salt of a low molecular aliphatic monocarboxylic acid. It is desirable to proportion the reactants so that less than two but at least one metal atom acts upon two molecules of the monoazo dyestuff.

Suitable chromium compounds are, e.g., chromic fluoride, chromic sulfate, chromic formate, chromic acetate, potassium chromic sulfate and ammonium chromic sulfate. The chromates also—e.g., sodium and potassium chromate or bichromate—are eminently suitable for metallizing the monoazo dyestuffs. In this last case it is advisable to conduct the reaction in a strongly caustic alkaline solution, to which reducing substances may be added if desired.

Cobaltous formate, cobaltous acetate and cobaltous sulfate serve as cobalt compounds. When metallization is carried out in the concentrated aqueous solution of an alkali metal salt of a low molecular aliphatic monocarboxylic acid, water-insoluble metal compounds such as cobalt hydroxide and cobalt carbonate may be used as alternatives.

It is of particular advantage to conduct metallization in an aqueous or alkaline medium, the metal compounds being added in the presence of compounds which keep the metal dissolved in complex combination in caustic alkaline medium. Examples of such compounds are tartaric acid, citric acid and lactic acid.

The metal complex compounds thus obtained are precipitated from aqueous medium by the addition of salt; if desired the organic metallizing solution may be previously run into water. The precipitate is filtered, washed if desired and dried.

The resultant metal-containing azo dyestuffs are homogeneous metal complex compounds in which essentially one atom of metal is combined with two molecules of the monoazo compound. They are commonly termed 1:2 complexes wherein 1 molecule of the monoazo compound is combined with approximately 0.3 to 0.7 atom of metal.

The new chromium- or cobalt-containing azo dyestuffs dye wool, silk, leather and polyamide fibers from neutral or weakly acid dyebaths in orange, brown, brown-red and bordeaux shades, which are fast to washing, milling, perspiration, alkali and acids and very fast to light. Those which have sufficiently high solubility in organic solvents like acetone, ethyl alcohol, ethyl acetate, tetrahydrofuran, dimethylformamide are also suitable for dyeing artificial fibers in the mass, i.e., in solutions with organic solvents, prior to spinning into filament; they are also of interest for coloring paint and lacquer media and plastic moulding compounds. The thus dyed materials exhibit good fastness to light and wet treatments.

In the following examples all parts and percentages are by weight. The temperatures are given in degrees centigrade.

*Example 1*

26.4 parts of 2-amino-1-hydroxybenzene-4-sulfonic acid-phenylamide and 8 parts of sodium hydroxide are dissolved in 130 parts of water. After the further addition of 6.9 parts of sodium nitrite in 25 parts of water the resultant solution is run into a mixture of 48 parts of concentrated hydrochloric acid and 100 parts of ice, the temperature of the latter being not higher than 5°.

17.3 parts of 1-phenyl-3-methyl-5-aminopyrazole are dissolved in 18 parts of concentrated hydrochloric acid and 200 parts of water and added to the diazo suspension. After the addition of 50 parts of pyridine the coupling mass is heated to 35–40° and held at this temperature for 8 hours. On completion of coupling the mixture is soured to react acid on Congo red indicator paper, upon which the precipitated dyestuff is filtered off, washed with water and dried.

9 parts of the monoazo compound are dissolved in 90 parts of formamide at 80° and after the addition of 7 parts of crystallized sodium acetate and 3.6 parts of crystallized cobaltous sulfate the solution is maintained at 94–97° for 8 hours. After this time 85 parts of a 25% common salt solution are added. The completely precipitated dyestuffs is filtered off, washed with a 10% common salt solution and dried. On grinding it is obtained as a brown powder which possesses good affinity for wool, silk, leather and polyamide fibers. It dyes these fibers in yellowish brown shades of good fastness to light and wet agencies. Its solubility in acetone at 20° amounts to 20 grams per liter.

2 parts of the cobalt-containing azo dyestuff thus obtained are dissolved in 4000 parts of water at 40–50°. A piece of scoured wool fabric, 100 parts by weight, is introduced into the bath, to which 2 parts of 100% acetic acid are added dropwise. The dyebath is then heated to the boil in the course of 30 minutes and maintained at the boil for another 45 minutes. The dyed wool is then removed, rinsed with water and dried. It is dyed in a fast shade of brown.

*Example 2*

23 parts of 2-amino-1-carboxybenzene-5-sulfonic acid-methylamide and 20 parts of sodium carbonate are dissolved in 300 parts of water. 6.9 parts of sodium nitrite in 25 parts of water are added and the solution is then dropped into 70 parts of concentrated hydrochloric acid and 160 parts of water at 0–5°. 20.7 parts of 1-(3'-chloro)-phenyl-3-methyl-5-aminopyrazole are dissolved in 18 parts of concentrated hydrochloric acid and 200 parts of water and added to the diazo solution. The coupling mass is adjusted to pH 6 with soda and agitated for 12 hours at 20°. The dyestuff thus formed is precipitated, filtered off, washed with water and dried.

9 parts of the monoazo compound are dissolved in 90 parts of formamide at 80°. After the addition of 7 parts of crystallized sodium acetate and 7 parts of crystallized chromic potassium sulfate the solution is heated to 94–96° and this temperature maintained for 8 hours. The product, a chrome-containing dyestuff, is isolated as described in Example 1. It dyes wool, silk and polyamide fibers in orange shades of good light and wet fastness.

*Example 3*

20.2 parts of 2-amino-1-hydroxybenzene-4-sulfonic acid-methylamide are dissolved in a mixture of 20 parts of 30% hydrochloric acid and 500 parts of water. The solution is cooled to 0° and a solution of 6.9 parts of sodium nitrite in 20 parts of water is added slowly with stirring, the temperature being maintained at about 0°–5°. When the diazotization is completed, the diazo suspension is run into a solution of 17.3 parts of 1-phenyl-3-methyl-5-aminopyrazole in 18 parts of concentrated hydrochloric acid and 200 parts of water. After the addition of 70 parts of pyridine the coupling mass is heated to 35° and stirred at 35–40° for 8 hours.

The formed monoazo dyestuff is precipitated by souring the coupling mixture to react acid on Congo red indicator paper, then it is filtered off, washed with cold water, dried and ground.

The chromium complex compound obtained by treating the monoazo compound with chromic potassium sulfate or chromic ammonium sulfate according to the particulars of Example 2 is a brown powder which dyes wool, silk and synthetic polyamide fibers in brownish red shades possessing good fastness to light, washing, milling perspiration, alkali and acids.

The cobalt complex compound may be prepared as follows:

9 parts of the monoazo compound are dissolved in 100 parts of ethylglycol at 80° and after the addition of 7 parts of crystallized sodium acetate and 3.6 parts of crystallized cobaltous sulfate the solution is maintained at 94–97° for 8 hours. After this time 85 parts of a 25% common salt solution are added. The completely precipitated dyestuff is filtered off, washed with a 10% common salt solution and dried. On grinding it is obtained as a brown powder which possesses good affinity for wool, silk, leather and polyamide fibers. It dyes these fibers in yellowish brown shades of good fastness to light and wet agencies. In salt free form it possesses a solubility of 50 grams per liter of acetone at 20°.

Further chromium- and cobalt-containing azo dyestuffs which are obtainable according to the particulars given in Examples 1 to 3 are set out in the table below. They are characterized by the diazo and coupling components (columns (I) and (II)), the form in which they are applied (III) and the shade of the metallized dyeing on wool (IV).

The abbreviations in column (III) stand for:

Afterchr.=afterchroming dyestuff
    Cr-C=chrome-complex dyestuff
    Co-C=cobalt-complex dyestuff

TABLE

| Example No. | Diazo component (I) | Coupling component (II) | Form in which applied (III) | Shade of metallized dyeing on wool (IV) |
|---|---|---|---|---|
| 4 | 2-amino-1-hydroxybenzene-5-sulfonic acid-methylamide | 1-phenyl-3-methyl-5-aminopyrazole | Co-C | Yellowish brown. |
| 5 | 2-amino-1-hydroxybenzene-4-sulfonic-acid-(3'-methoxy)-propylamide | do | Cr-C | Brownish Bordeaux. |
|  |  |  | Cr-C | Brownish red. |
| 6 | 2-amino-1-hydroxybenzene-4-sulfonic acid-amide | do | Co-C | Yellowish brown. |
|  |  |  | Co-C | Yellowish brown. |
| 7 | 2-amino-1-carboxybenzene-5-sulfonic acid-amide | do | Cr-C | Brownish red. |
|  |  |  | Cr-C | Orange. |
| 8 | 2-amino-1-carboxybenzene-5-sulfonic acid-phenylamide | 1-(3'chloro-)-phenyl-3-methyl-5-aminopyrazole | Co-C | Brown. |
|  |  |  | Cr-C | Orange. |
| 9 | 2-amino-1-hydroxybenzene-5-sulfonic acid-methylamide | do | Co-C | Brown. |
|  |  |  | Co-C | Yellowish brown. |
| 10 | 2-amino-1-hydroxybenzene-4-sulfonic acid-methylamide | do | Cr-C | Brownish Bordeaux. |
|  |  |  | Cr-C | Brownish red. |
| 11 | 2-amino-1-hydroxybenzene-4-sulfonic acid-(2'-hydroxy)-ethylamide | do | Co-C | Yellowish brown. |
|  |  |  | Co-C | Yellowish brown. |
|  |  |  | Cr-C | Brownish red. |

TABLE—Continued

| Example No. | Diazo component (I) | Coupling component (II) | Form in which applied (III) | Shade of metallized dyeing on wool (IV) |
|---|---|---|---|---|
| 12 | 2-amino-1-hydroxybenzene-4-sulfonic acid-ethylamide. | 1-(3'chloro-)-phenyl-3-methyl-5-aminopyrazole. | Cr-C | Brownish red. |
| 13 | 2-amino-1-hydroxybenzene-4-sulfonic acid-amide. | ____do____ | Cr-C / Co-C | Brownish red. / Yellowish brown. |
| 14 | 2-amino-1-hydroxybenzene-4-sulfonic acid-(2'-ethoxy)-ethylamide. | ____do____ | Co-C / Cr-C | Yellowish brown. / Brownish red. |
| 15 | 2-amino-1-hydroxybenzene-4-sulfonic acid-phenylamide. | 1-(4'-chloro)-phenyl-3-methyl-5-aminopyrazole. | Co-C / Cr-C | Yellowish brown. / Brownish red. |
| 16 | 2-amino-1-hydroxybenzene-4-sulfonic acid-methylamide. | ____do____ | Cr-C / Co-C | Brownish red. / Yellowish brown. |
| 17 | 2-amino-1-hydroxybenzene-4-sulfonic acid-(2'-hydroxy)-propylamide. | ____do____ | Co-C / Cr-C | Yellowish brown. / Brownish red. |
| 18 | 2-amino-1-hydroxybenzene-4-sulfonic acid-amide. | ____do____ | Cr-C / Co-C | Brownish red. / Yellowish brown. |
| 19 | 2-amino-1-hydroxybenzene-4-sulfonic acid-isopropylamide. | ____do____ | Co-C / Cr-C | Yellowish brown. / Brownish red. |
| 20 | 2-amino-1-carboxybenzene-5-sulfonic acid-methylamide. | ____do____ | Co-C / Cr-C | Brown. / Orange. |
| 21 | ____do____ | 1-(2'.5'-dichloro)-phenyl-3-methyl-5-amino-pyrazole. | Cr-C / Co-C | Orange. / Brown. |
| 22 | 2-amino-1-hydroxybenzene-5-sulfonic acid-butylamide. | ____do____ | Cr-C | Brownish Bordeaux. |
| 23 | 2-amino-1-hydroxybenzene-4-sulfonic acid-amide. | ____do____ | Cr-C / Co-C | Brownish red. / Yellowish brown. |
| 24 | 2-amino-1-hydroxybenzene-4-sulfonic acid-(3'-isopropoxy)-propylamide. | ____do____ | Co-C / Cr-C | Yellowish brown. / Brownish red. |
| 25 | 2-amino-1-hydroxybenzene-4-sulfonic acid-(4'-methyl)-phenylamide. | ____do____ | Cr-C / Co-C | Brownish red. / Yellowish brown. |
| 26 | 2-amino-1-hydroxy-4-methylsulfonylbenzene | ____do____ | Cr-C | Brownish red. |
| 27 | 2-amino-1-hydroxy-4-ethylsulfonylbenzene | 1-(4'-methyl)-phenyl-3-methyl-5-amino-pyrazole. | Cr-C / Co-C | Brownish red. / Yellowish brown. |
| 28 | 2-amino-1-hydroxybenzene-4-sulfonic acid-ethylamide. | ____do____ | Co-C / Cr-C | Yellowish brown. / Brownish red. |
| 29 | 2-amino-1-hydroxybenzene-4-sulfonic acid-di-(2'-hydroxy)-ethylamide. | ____do____ | Cr-C | Brownish red. |
| 30 | 2-amino-1-hydroxy-4-chlorobenzene | 1-phenyl-3-methyl-5-amino-pyrazole-3'-sulfonic acidamide. | Cr-C / Co-C | Brownish red. / Yellowish brown. |
| 31 | 2-amino-1-hydroxybenzene-4-sulfonic acid-cyclohexylamide. | 1-(4'-methyl)-phenyl-3-methyl-5-amino-pyrazole. | Cr-C | Brownish red. |
| 32 | 2-aminobenzene-1-carboxylic acid | 1-phenyl-3-methyl-5-amino-pyrazole-3'-sulfonic acidamide. | Co-C / Cr-C | Brown. / Orange. |
| 33 | 2-amino-1-hydroxy-4-nitrobenzene | 1-phenyl-3-methyl-5-amino-pyrazole-3'-sulfonic acidamide. | Cr-C | Brownish red. |
| 34 | ____do____ | 1-phenyl-3-methyl-5-amino-pyrazole-3'-sulfonic acid-phenylamide. | Cr-C / Co-C | Brownish red. / Yellowish brown. |
| 35 | 2-amino-1-hydroxy-4-nitro-6-chlorbenzene | ____do____ | Cr-C / Co-C | Brownish red. / Yellowish brown. |
| 36 | 2-amino-1-hydroxybenzene | 1-phenyl-3-methyl-5-amino-pyrazole-3'-sulfonic acid-cyclohexylamide. | Cr-C / Co-C | Brownish red. / Yellowish brown. |
| 37 | 2-amino-1-hydroxy-4-methyl-benzene | ____do____ | Co-C | Yellowish brown. |
| 38 | 2-amino-1-hydroxy-4-acetylaminobenzene | 1-phenyl-3-methyl-5-amino-pyrazole | Co-C | Yellowish brown. |
| 39 | 2-amino-1-hyrdoxybenzene-4-sulfonic acid-phenylamide. | ____do____ | Cr-C / Co-C | Brownish red. / Yellowish brown. |
| 40 | ____do____ | 1-(3'-chloro)-phenyl-3-methyl-5-amino-pyrazole. | Co-C | Yellowish brown. |
| 41 | 2-amino-1-hydroxybenzene-4-sulfonic acid-benzylamide. | 1-phenyl-3-methyl-5-amino-pyrazole | Cr-C / Co-C | Brownish red. / Yellowish brown. |
| 42 | 2-amino-1-hydroxybenzene-4-sulfonic acid-(4'-methoxy)-phenylamide. | 1-(3'-methylsulfonyl)-phenyl-3-methyl-5-aminopyrazole. | Cr-C | Brownish red. |
| 43 | 2-amino-1-hydroxybenzene-4-sulfonic acid-amide. | 1-phenyl-3-methyl-5-aminopyrazole | Cr-C / Co-C | Brownish red. / Yellowish brown. |
| 44 | 2-aminobenzene-1-carboxylic acid | ____do____ | Co-C / Cr-C | Brown. / Orange. |
| 45 | ____do____ | 1-(2'.5'-dichloro)-phenyl-3-methyl-5-amino-pyrazole. | Cr-C / Co-C | Orange. / Brown. |
| 46 | 2-amino-5-nitrobenzene-1-carboxylic acid | 1-(3'-chloro)-phenyl-3-methyl-5-aminopyrazole. | Cr-C | Brown. |
| 47 | 2-aminobenzene-1-carboxylic acid | ____do____ | Cr-C / Co-C | Orange. / Brown. |
| 48 | 2-amino-1-carboxybenzene-5-sulfonic acid-phenylamide. | 1-phenyl-3-methyl-5-aminopyrazole | Cr-C / Co-C | Orange. / Brown. |
| 49 | 2-amino-1-hydroxy-4-chlorobenzene-5-sulfonic acid-phenylamide. | ____do____ | Co-C / Cr-C | Yellowish brown. / Brownish Bordeaux. |
| 50 | ____do____ | 1-(3'-chloro)-phenyl-3-methyl-5-aminopyrazole. | Cr-C / Co-C | Brownish Bordeaux. / Yellowish brown. |
| 51 | 2-amino-1-hydroxybenzene-4-sulfonic acid-(3'-methoxy)-propylamide. | ____do____ | Co-C / Cr-C | Yellowish brown. / Brownish red. |
| 52 | 2-amino-1-hydroxybenzene-4-sulfonic acid-phenylamide. | 1-(2'.5'-dichloro)-phenyl-3-methyl-5-aminopyrazole. | Cr-C / Co-C | Brownish red. / Yellowish brown. |
| 53 | 2-amino-1-hydroxybenzene-5-sulfonic acid-amide. | 1-(3'-chloro)-phenyl-5-aminopyrazole | Cr-C / Co-C | Brownish Bordeaux. / Yellowish brown. |
| 54 | 2-amino-1-hydroxybenzene-5-sulfonic acid-(2'-hydroxy)-ethylamide. | 1-(4'-methyl)-phenyl-5-aminopyrazole | Cr-C / Co-C | Yellowish brown. / Brownish Bordeaux. |
| 55 | 2-amino-1-hydroxybenzene-4-sulfonic acid-(3'-methoxy)-propylamide. | 1-(2'.5'-dichloro)-phenyl-5-aminopyrazole | Cr-C / Co-C | Brownish red. / Yellowish brown. |
| 56 | 2-amino-1-hydroxybenzene-4-sulfonic acid-methylamide. | ____do____ | Co-C | Yellowish brown. |
| 57 | 2-amino-1-hydroxybenzene-4-sulfonic acid-phenylamide. | 1-(4'-chloro)-phenyl-5-aminopyrazole | Co-C / Cr-C | Yellowish brown. / Brownish red. |
| 58 | ____do____ | 1-phenyl-5-aminopyrazole | Co-C / Cr-C | Yellowish brown. / Brownish red. |
| 59 | ____do____ | 1-phenyl-5-aminopyrazole-3'-sulfonic acid-phenylamide. | Co-C / Cr-C | Yellowish brown. / Brownish red. |
| 60 | 2-amino-1-hydroxy-4-chloro-6-nitrobenzene | ____do____ | Co-C / Cr-C | Yellowish brown. / Brownish red. |
| 61 | 2-amino-1-hydroxy-4.6-dichlorobenzene | 1-phenyl-5-aminopyrazole-4'-sulfonic acid-(3''-methoxy)-butylamide. | Cr-C | Brownish red. |
| 62 | 2-amino-1-hydroxy-4-chlorobenzene-5-sulfonic acidethylamide. | 1-phenyl-5-aminopyrazole | Cr-C / Co-C | Brownish Bordeaux. / Yellowish brown. |
| 63 | 2-aminobenzene-1-carboxylic acid | ____do____ | Co-C / Cr-C | Brown. / Orange. |
| 64 | 2-amino-1-hydroxy-4-methyl-6-nitrobenzene | 1-(3'-methyl)-phenyl-3-methyl-5-aminopyrazole. | Cr-C | Brownish red. |

TABLE—Continued

| Example No. | Diazo component (I) | Coupling component (II) | Form in which applied (III) | Shade of metallized dyeing on wool (IV) |
|---|---|---|---|---|
| 65 | 2-amino-1-hydroxy-4-tert. butylbenzene | 1-(3'-methoxy)-phenyl-3-methyl-5-amino-pyrazole. | Cr-C | Brownish red. |
| 66 | 2-amino-1-hydroxy-4-nitrobenzene | 1-(4'-methoxy)-phenyl-5-aminopyrazole | Cr-C / Co-C | Brownish red. / Yellowish brown. |
| 67 | 2-amino-1-hydroxy-4-bromobenzene | 1-(4'-acetylamino)-phenyl-3-methyl-5-amino-pyrazole. | Co-C / Cr-C | Yellowish brown. / Brownish red. |
| 68 | 2-amino-1-hydroxybenzene-4-sulfonic acid-methylamide. | 1-(3'-nitro)-phenyl-3-methyl-5-aminopyrazole | Cr-C | Brownish red. |
| 69 | ....do.... | 1-naphthyl-(1')-3-methyl-5-aminopyrazole-4'-sulfonic acid-amide. | Cr-C | Brownish red. |
| 70 | 2-amino-1-hydroxy-4-bromobenzene | 1-naphthyl-(2')-3-methyl-5-aminopyrazole-6'-sulfonic acid-amide. | Cr-C | Brownish red. |
| 71 | 2-amino-1-hydroxybenzene-4-sulfonic acid-amide. | 1-(2'.3'-tetramethylene)-phenyl-5-aminopyrazole-4'-sulfonic acid-dimethylamide. | Cr-C / Co-C | Brownish red. / Yellowish brown. |
| 72 | ....do.... | 1-(2'.3'-tetramethylene)-phenyl-3-methyl-5-aminopyrazole-4'-sulfonic acid-methylamide. | Cr-C / Co-C | Brownish red. / Yellowish brown. |
| 73 | 2-amino-1-hydroxy-4-methyl-sulfonylamino-benzene. | 1-(3'-bromo)-phenyl-3-methyl-5-amino-pyrazole. | Co-C | Yellowish brown. |
| 74 | 2-amino-1-hydroxy-4-chloro-6-nitrobenzene | 1-(4'-nitro)-phenyl-5-aminopyrazole | Co-C / Cr-C | Yellowish brown. / Brownish red. |
| 75 | ....do.... | 1-(3'-acetylamino)-phenyl-5-aminopyrazole | Cr-C / Co-C | Brownish red. / Yellowish brown. |
| 76 | 2-aminobenzene-1-carboxylic acid | 1-(3'-methylsulfonylamino)-phenyl-5-amino-pyrazole. | Cr-C / Co-C | Orange. / Brown. |
| 77 | 2-amino-1-carboxybenzene-5-sulfonic acid-phenylamide. | 1-phenyl-5-aminopyrazole | Cr-C / Co-C | Orange. / Brown. |
| 78 | 2-amino-1-carboxybenzene-5-sulfonic acid-amide. | 1-(4'-phenylsulfonylamino)-phenyl-3-methyl-5-aminopyrazole. | Cr-C | Orange. |

Example 79

100 parts of secondary cellulose acetate with a content of 54–55% of splittable acetic acid are dissolved in 300 parts of a solvent (e.g., a mixture of 275 parts of acetone and 25 parts of methanol). After homogeneous mixing the mass is left overnight to swell. Next day 1 part of the cobalt complex dyestuff obtained according to Example 3 is dissolved in 60 parts of the same solvent. This solution is added to the cellulose acetate solution and the whole is agitated long enough for 60 parts of the solvent to evaporate.

The dyed acetate solution is filtered through a cotton filter and a cotton wool pressure filter before entering the spinning unit. The final phase of the operation to the formation of the dyed filament, is the same as in the production of undyed cellulose acetate.

Formulae of representative dyestuffs of the foregoing examples are as follows:

Example 1

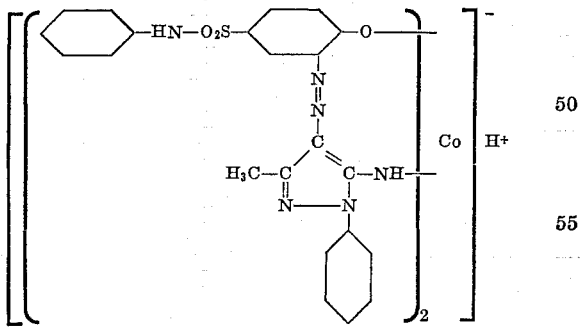

Example 2

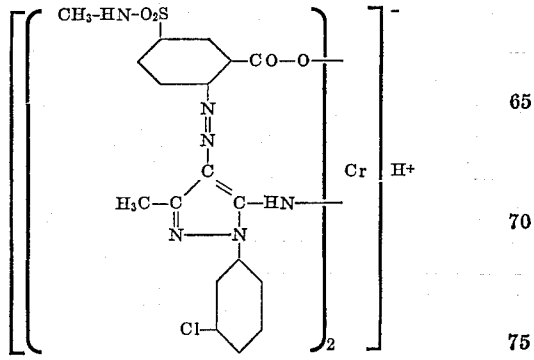

Example 3

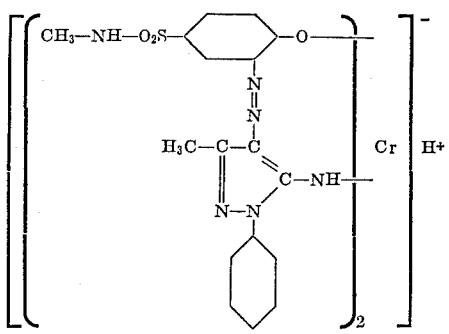

Example 39

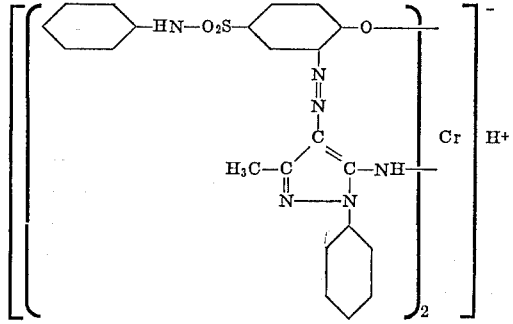

Example 40

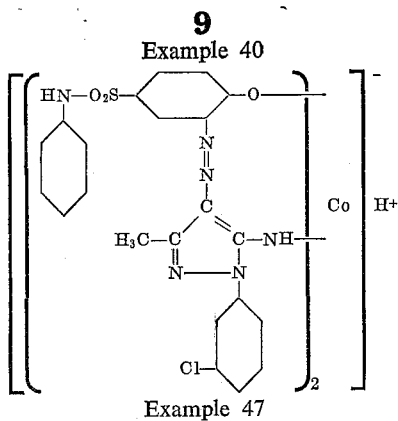

Example 47

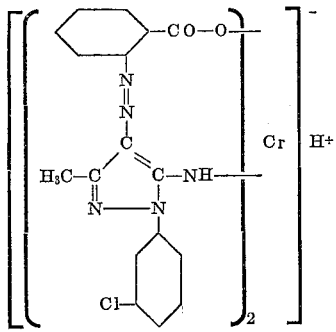

Having thus disclosed the invention, what is claimed is:

1. A metal complex dyestuff which corresponds to the formula

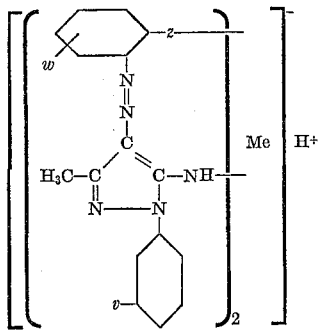

wherein z is a bridging link selected from the group consisting of —O— and —COO—, w is a member selected from the group consisting of a hydrogen atom, a lower alkyl sulfonyl, a sulfonic acid lower alkyl amide, a sulfonic acid lower oxyalkyl amide, and a sulfonic acid mononuclear aryl amide group, v is a member selected from the group consisting of a hydrogen atom and a chlorine atom, and Me is a metal atom selected from the group consisting of a chromium and a cobalt atom.

2. The cobalt complex dyestuff which corresponds to the formula

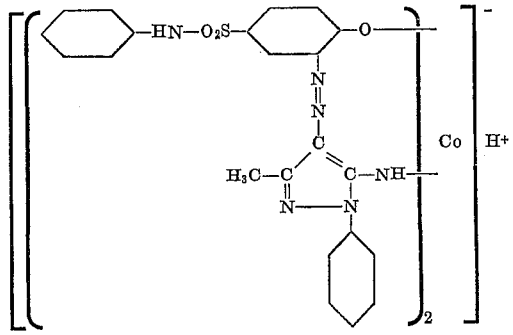

3. The chromium complex dyestuff which corresponds to the formula

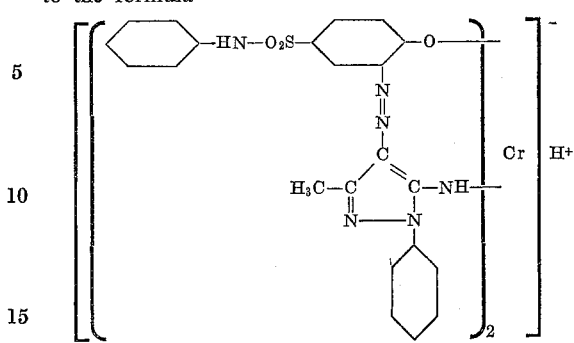

4. The cobalt complex dyestuff which corresponds to the formula

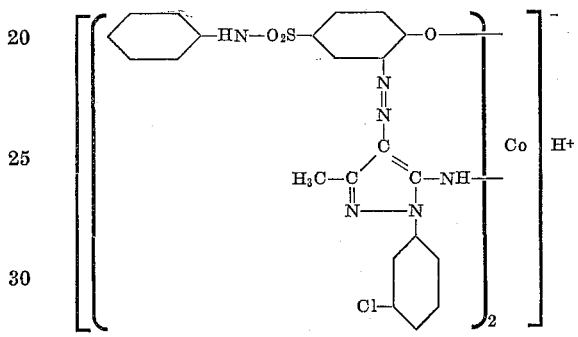

5. The chromium complex dyestuff which corresponds to the formula

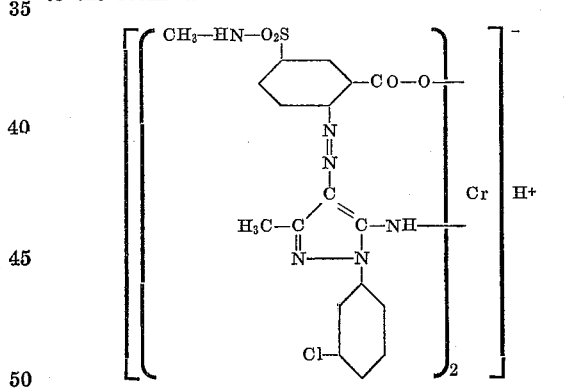

6. The chromium complex dyestuff which corresponds to the formula

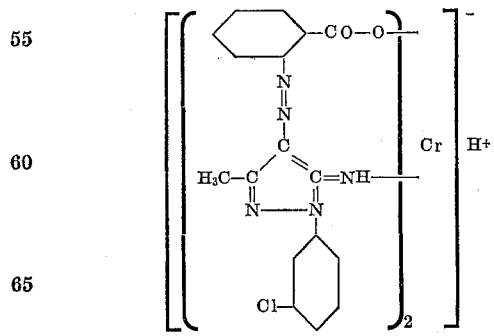

References Cited in the file of this patent

UNITED STATES PATENTS 2,241,796    Taube et al.            May 13, 1941
2,814,615    Zickendraht           Nov. 26, 1957

OTHER REFERENCES

Venkataraman: Synthetic Dyes, vol. I, p. 540 (1952).